United States Patent
Baik et al.

(10) Patent No.: US 12,152,731 B2
(45) Date of Patent: Nov. 26, 2024

(54) QUICK CONNECTING RECEPTACLE FOR LIQUID HYDROGEN STORAGE TANK

(71) Applicant: H2CREO Corp., Dover, DE (US)

(72) Inventors: Jong H Baik, Titusville, FL (US); Sung Yong Kim, Yongin-si (KR); Jeong Hyun Im, Yeongwol-gun (KR); Hyung Jin Kim, Yongin-si (KR)

(73) Assignee: H2CREO Corp., Dover, DE (US)

( * ) Notice: Subject to any disclaimer, the term of this patent is extended or adjusted under 35 U.S.C. 154(b) by 13 days.

(21) Appl. No.: 18/194,301

(22) Filed: Mar. 31, 2023

(65) Prior Publication Data

US 2024/0175552 A1 May 30, 2024

Related U.S. Application Data (60) Provisional application No. 63/384,975, filed on Nov. 25, 2022.

(51) Int. Cl.
*F17C 13/04* (2006.01)
*F17C 5/02* (2006.01)
*F17C 7/02* (2006.01)

(52) U.S. Cl.
CPC ............... *F17C 13/04* (2013.01); *F17C 5/02* (2013.01); *F17C 7/02* (2013.01); *F17C 2221/012* (2013.01); *F17C 2227/04* (2013.01); *F17C 2270/0763* (2013.01)

(58) Field of Classification Search
CPC .... F17C 13/04; F17C 5/02; F17C 7/02; F17C 2221/012; F17C 2227/04; F17C 2270/0763; F17C 9/02; B60K 15/03
USPC ......................................................... 141/59
See application file for complete search history.

(56) References Cited

U.S. PATENT DOCUMENTS

| | | | |
|---|---|---|---|
| 2005/0247352 A1* | 11/2005 | Kamiya | F16L 37/565 137/614.04 |
| 2024/0110671 A1* | 4/2024 | Dimmer | F16L 59/141 |

FOREIGN PATENT DOCUMENTS

| | | | | |
|---|---|---|---|---|
| KR | 10-2328717 B1 | 11/2021 | | |
| KR | 10-2328719 B1 | 11/2021 | | |
| KR | 102328718 B1 * | 11/2021 | .............. | F17C 13/04 |

OTHER PUBLICATIONS

KR 102328718 B1—English Translation (Year: 2021).*

* cited by examiner

*Primary Examiner* — Timothy L Maust
*Assistant Examiner* — Christopher M Afful
(74) *Attorney, Agent, or Firm* — McDonnell Boehnen Hulbert & Berghoff LLP (57) ABSTRACT

The present disclosure discloses a quick-connecting receptacle for a liquid hydrogen storage tank. The quick-connecting receptacle comprises: a storage tank for storing liquid hydrogen; and a receptacle connecting an external transmission pipe and the storage tank so that liquid hydrogen introduced through the external transmission pipe is stored in the storage tank. The receptacle includes an upper receptacle connected to a lower end portion of the transmission pipe and a lower receptacle connected to an upper portion of the storage tank. The lower receptacle includes a cylinder member accommodated therein, and as the cylinder member moves up and down, liquid hydrogen or gaseous hydrogen is stored in the storage tank or liquid hydrogen or gaseous hydrogen is discharged from the storage tank to outside.

10 Claims, 8 Drawing Sheets

QUICK CONNECTING RECEPTACLE FOR LIQUID HYDROGEN STORAGE TANK

PRIORITY

The present disclosure claims priority to U.S. Provisional Pat. App. No. 63/384,975, filed Nov. 25, 2022, which is hereby incorporated by reference herein in its entirety.

FIELD OF THE INVENTION

The present disclosure relates to a quick-connecting receptacle for a liquid hydrogen storage tank capable of easily and stably connecting an external transmission pipe and a storage tank to store liquid hydrogen in a storage tank and discharge gaseous hydrogen charged in the storage tank.

BACKGROUND OF THE INVENTION

In general, petroleum, coal, natural gas, etc. are used as energy sources, but these resources are limited resources and have the disadvantage of emitting carbon compounds that cause global warming. Accordingly, technologies are being developed that use hydrogen as an energy source, which has the advantages of generating electricity in an environmentally friendly and efficient manner, being sustainable without the risk of depletion, and being easy to store and transport.

Hydrogen exists in a gaseous state at room temperature and is bulky, making it difficult to store or transport. Accordingly, a method of using liquefied hydrogen by liquefying hydrogen at −253° C. is mainly used, and such liquefied hydrogen must be continuously maintained at an extremely low temperature of −253° C. during transportation and storage. Since liquefied hydrogen can be re-vaporized when a change such as a temperature rise occurs, transfer pipes, storage tanks, connection connectors, etc. in contact with liquefied hydrogen need to be provided with materials that do not denature even at cryogenic temperatures.

Adapters, connectors, etc. may generally be used when connecting a transfer pipe for transporting liquefied hydrogen to a storage tank. Conventional adapters and connectors have problems that a temperature of liquefied hydrogen may change, or foreign substances may flow into the liquefied hydrogen as the transfer pipe and the storage tank are exposed to atmosphere.

PRIOR DISCLOSURES (Patent Document 1) Korean Patent Registration No. 10-2328718
(Patent Document 2) Korean Patent Registration No. 10-2328717
(Patent Document 3) Korean Patent Registration No. 10-2328719

SUMMARY OF THE INVENTION

The present disclosure is to provide a quick-connecting receptacle for a liquid hydrogen storage tank, wherein an upper receptacle coupled to an external transmission pipe and a lower receptacle coupled to a storage tank are provided so that liquid hydrogen introduced from the external transmission pipe can be stably stored in the storage tank, and the upper receptacle and the lower receptacle are easily coupled.

In addition, the present disclosure is to provide a quick-connecting receptacle for a liquid hydrogen storage tank provided with a cylinder member accommodated in the receptacle and movable up and down so that liquid hydrogen or gaseous hydrogen can be easily charged or discharged.

In addition, the present disclosure is to provide a quick-connecting receptacle for a liquid hydrogen storage tank provided with a cylinder member including an upper seal and a lower seal to prevent loss of liquid hydrogen or gaseous hydrogen in the receptacle.

In addition, the present disclosure is to provide a quick-connecting receptacle for a liquid hydrogen storage tank having a cylinder member including an upper seal and a lower seal formed by cryogenic sealing so that denaturation does not occur even when in contact with liquid hydrogen.

The purpose of the embodiments of the present disclosure is not limited to the above-mentioned purpose, and other objects not mentioned above will be clearly understood by those skilled in the art from the description below.

According to one aspect of the present disclosure, a quick-connecting receptacle for a liquid hydrogen storage tank may be provided, which may comprise: a storage tank for storing liquid hydrogen; and a receptacle connecting an external transmission pipe and the storage tank so that liquid hydrogen introduced through the transmission pipe is stored in the storage tank. Wherein the receptacle may include an upper receptacle connected to a lower end portion of the transmission pipe and a lower receptacle connected to an upper portion of the storage tank; and the lower receptacle may include a cylinder member accommodated therein, and as the cylinder member moves up and down, liquid hydrogen or gaseous hydrogen may be stored in the storage tank or liquid hydrogen or gaseous hydrogen is discharged from the storage tank to outside.

According to an embodiment of the present disclosure, the upper receptacle may comprise: an upper receptacle body; an upper connecting portion protruding from a side surface of the upper receptacle body so that the lower receptacle and the upper receptacle are coupled; a first flow path formed penetrating a central portion of the upper receptacle body and through which liquid hydrogen flows; a second flow path formed in a vertical direction along a circumference of the first flow path and through which gaseous hydrogen flows; a first inlet/outlet formed so that a lower end portion of the first flow path is open to allow liquid hydrogen to enter/exit; a second inlet/outlet formed in a lower portion of the second flow path through which gaseous hydrogen enters/exits; and a third port formed so that gaseous hydrogen is discharged to outside or introduced from outside.

According to an embodiment of the present disclosure, the lower receptacle may comprise: a lower receptacle body formed in a cylindrical shape; a lower connecting portion protruding from an upper end portion of the lower receptacle body so that the upper receptacle and the lower receptacle are coupled; a cylinder spring provided on a bottom surface of the lower receptacle body to support the cylinder member; a first port formed in the lower portion of the lower receptacle body and through which liquid hydrogen enters/exits; and a second port formed spaced apart from the first port by a predetermined distance upward and through which gaseous hydrogen enters/exits.

According to an embodiment of the present disclosure, an upper seal may be provided on an upper side of the cylinder member, so that upper and lower portions of the upper seal are blocked from each other by the upper seal, and wherein a lower seal may be provided on a lower side of the cylinder member, so that upper and lower portions of the lower seal are blocked from each other by the lower seal.

According to an embodiment of the present disclosure, the cylinder member may comprise at least one cylinder hole provided between the upper seal and the lower seal to allow liquid hydrogen to enter/exit.

According to an embodiment of the present disclosure, when the upper receptacle and the lower receptacle are coupled, the cylinder member may move downward by the first flow path, and the first port may be located between the upper seal ring and the lower seal.

According to an embodiment of the present disclosure, liquid hydrogen introduced through the first flow path sequentially may flow through the first inlet/outlet, inside of the cylinder member, the cylinder hole, and the first port, and is stored in the storage tank.

According to an embodiment of the present disclosure, gaseous hydrogen stored in the storage tank may be sequentially discharged to outside through the second port, the second inlet/outlet, the second flow path, and the third port.

According to an embodiment of the present disclosure, liquid hydrogen stored in the storage tank may be sequentially discharged to outside through the first port, the cylinder hole, inside of the cylinder member, the first inlet/outlet, and the first flow path.

According to an embodiment of the present disclosure, gaseous hydrogen introduced through the third port may be sequentially stored in the storage tank through the second flow path, the second inlet/outlet, and the second port.

According to an embodiment of the present disclosure, when the upper receptacle and the lower receptacle are coupled, the cylinder member may move downward by the first flow path, and the second port may be located between the upper seal and the lower seal.

According to an embodiment of the present disclosure, gaseous hydrogen stored in the storage tank may be sequentially discharged to outside through the second port, the cylinder hole, inside of the cylinder member, the first inlet/outlet, and the first flow path.

In the present disclosure, the upper receptacle coupled to the transmission pipe and the lower receptacle coupled to the storage tank are provided so that the upper receptacle and the lower receptacle may be easily coupled so that liquid hydrogen introduced from the external transmission pipe can be stably stored in the storage tank.

In addition, in the present disclosure, the cylinder member accommodated in the receptacle and movable up and down may be provided so that liquid hydrogen or gaseous hydrogen can be easily charged or discharged.

In addition, in the present disclosure, by providing the upper seal and the lower seal to the cylinder member, it is possible to prevent liquid hydrogen or gaseous hydrogen from being lost in the receptacle.

In addition, in the present disclosure, since the upper seal and the lower seal of the cylinder member are formed as cryogenic sealing, it is possible to prevent the upper seal and the lower seal from being denatured even when in contact with liquid hydrogen.

DESCRIPTION OF THE INVENTION

Hereinafter, with reference to the accompanying drawings, the embodiments of the present disclosure will be described in detail so that those of ordinary skill in the art to which the present disclosure pertains can readily implement them. However, the present disclosure may be implemented in several different forms and is not limited to the embodiments described herein.

In order to clearly explain the present disclosure in the drawings, parts irrelevant to the description are omitted, and similar reference numerals are attached to similar parts throughout the specification.

Throughout the specification, when a part "includes" or "comprises" a certain component, it means that other components may be further included, rather than excluding other components, unless otherwise stated.

It is to be understood that the techniques described in the present disclosure are not intended to be limited to specific embodiments, and include various modifications, equivalents, and/or alternatives of the embodiments of the present disclosure.

Hereinafter, an embodiment of the present disclosure will be described with reference to the attached drawings. However, in the following description, to avoid unnecessarily obscuring the essentials of the present disclosure, detailed descriptions of well-known functions or configurations will be omitted in the following description.

Figure 1:
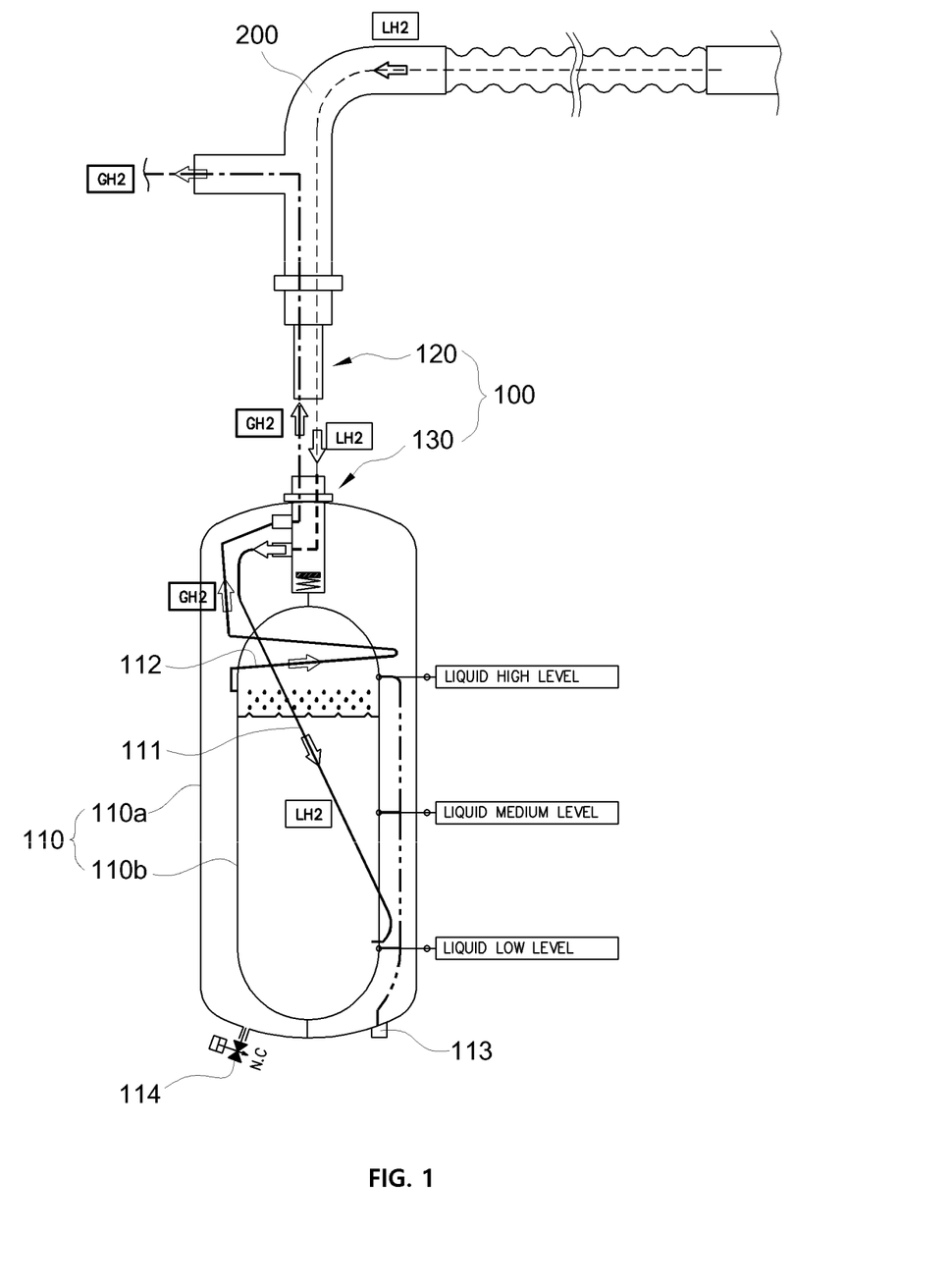
FIG. 1 is a diagram illustrating a quick-connecting receptacle for a liquid hydrogen LH2 storage tank according to an embodiment of the present disclosure.
Figure 2:
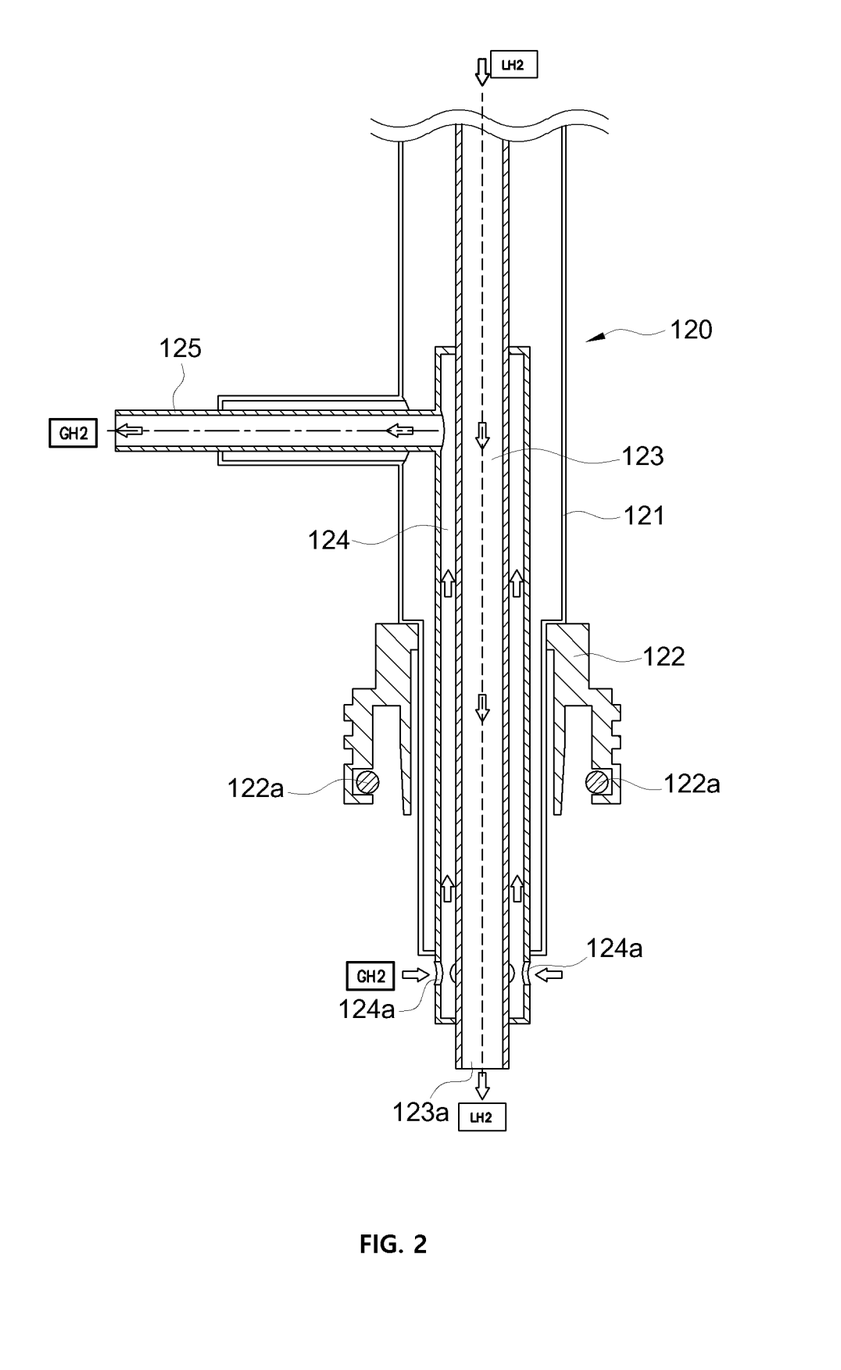
FIG. 2 is a diagram illustrating an upper receptacle of a quick-connecting receptacle for a liquid hydrogen LH2 storage tank according to an embodiment of the present disclosure.
Figure 3:
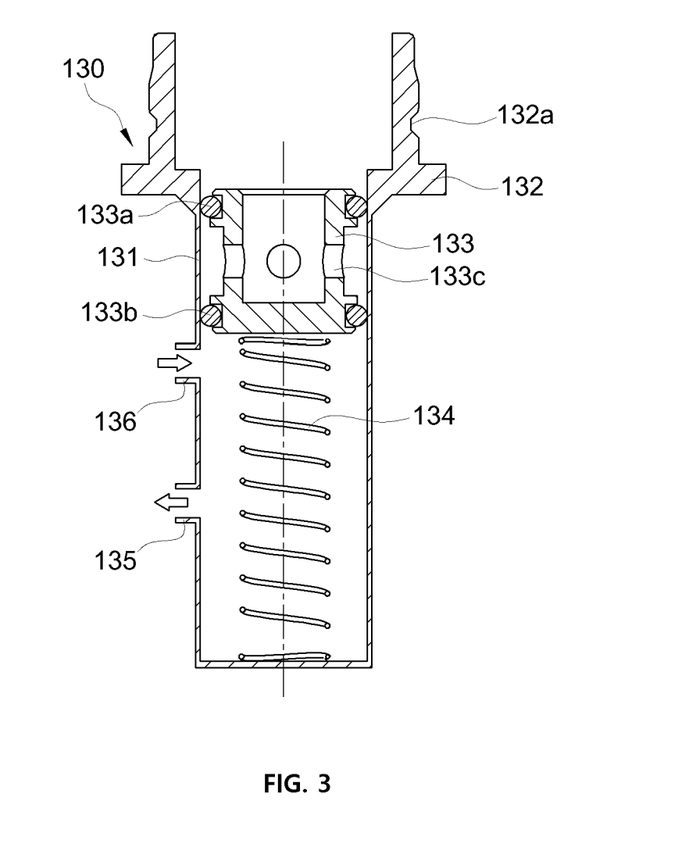
FIG. 3 is a diagram illustrating a lower receptacle of a quick-connecting receptacle for a liquid hydrogen LH2 storage tank according to an embodiment of the present disclosure.
Figure 4A:
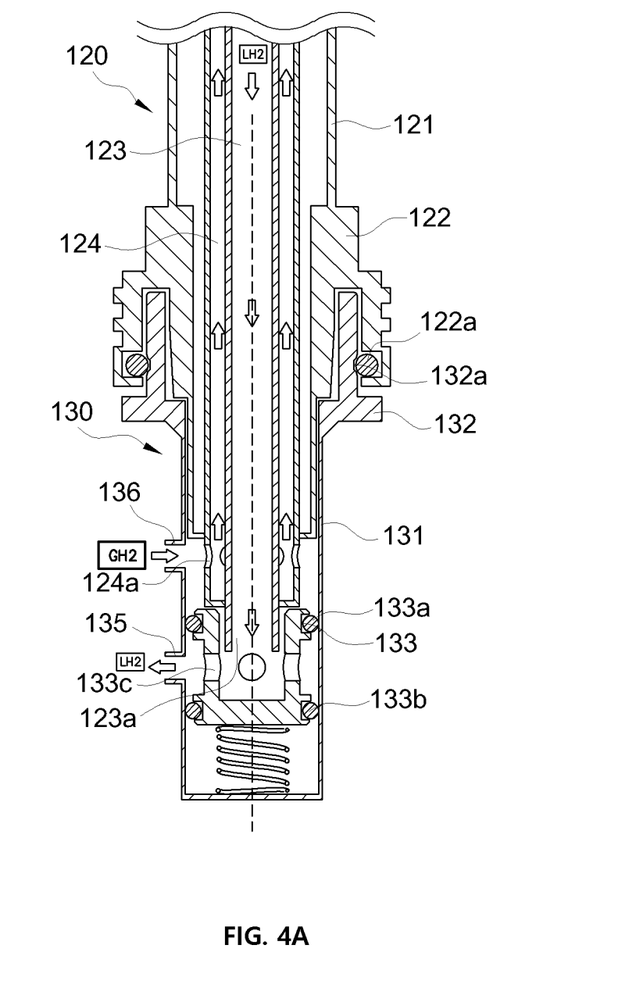
FIG. 4A is a diagram illustrating storage of liquid hydrogen LH2 using a quick-connecting receptacle for a liquid hydrogen LH2 storage tank according to an embodiment of the present disclosure.
Figure 4B:
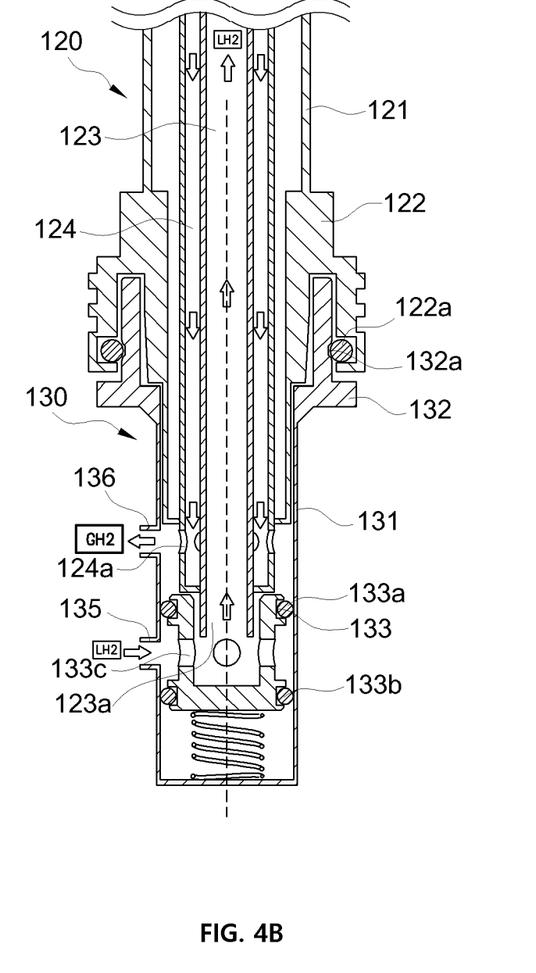
FIG. 4B is a diagram illustrating discharge of liquid hydrogen LH2 using a quick-connecting receptacle for a liquid hydrogen LH2 storage tank according to an embodiment of the present disclosure.
Figure 4C:
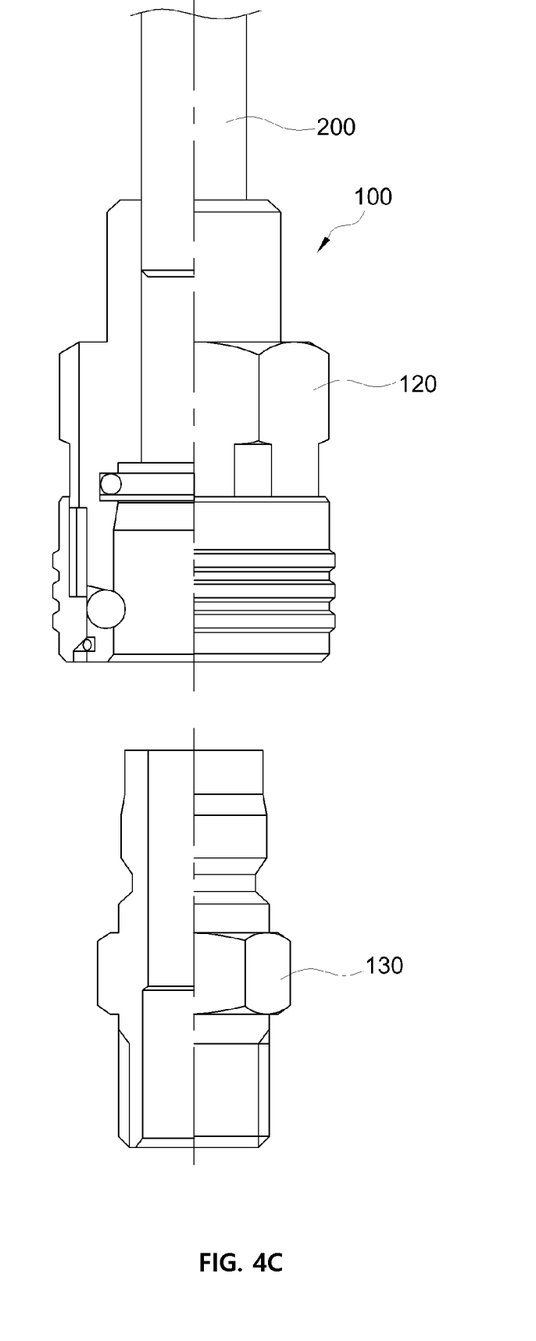
FIG. 4C is a diagram illustrating an upper receptacle and a lower receptacle of a quick-connecting receptacle for a liquid hydrogen LH2 storage tank according to an embodiment of the present disclosure.
Figure 5:
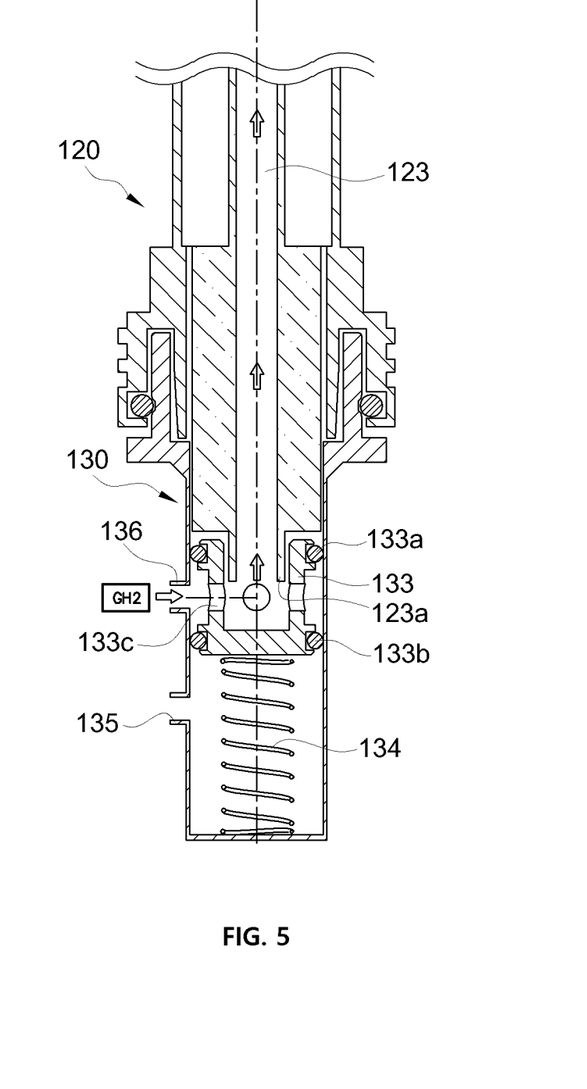
FIG. 5 is a diagram illustrating discharge of gaseous hydrogen GH2 using a quick-connecting receptacle for a liquid hydrogen LH2 storage tank according to another embodiment of the present disclosure.
Figure 6:
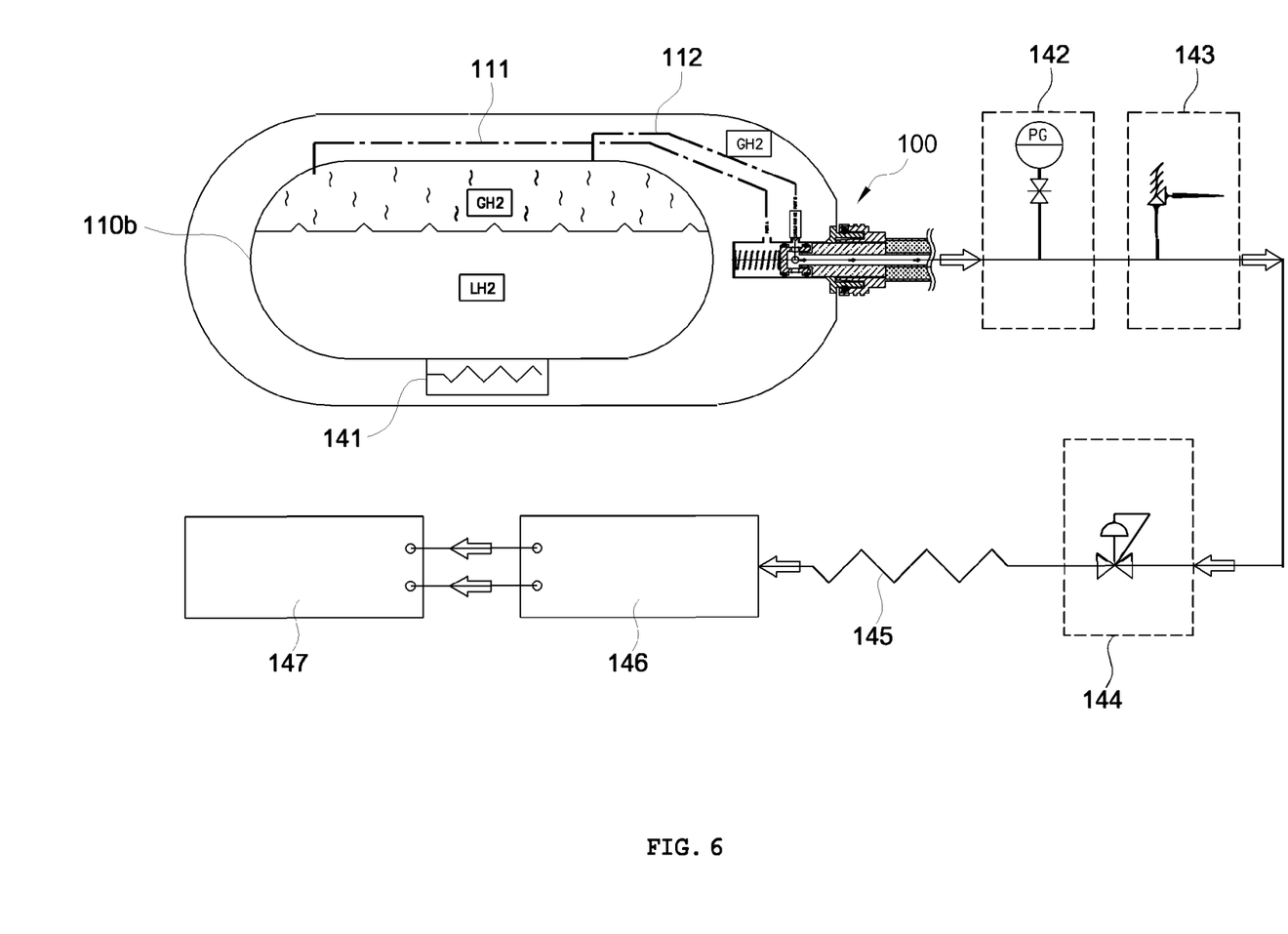
FIG. 6 is a diagram illustrating an example of using gaseous hydrogen GH2 discharged through a quick-connecting receptacle for a liquid hydrogen LH2 storage tank according to another embodiment of the present disclosure.

FIG. 1 is a diagram illustrating a quick-connecting receptacle for a liquid hydrogen LH2 storage tank according to an embodiment of the present disclosure; FIG. 2 is a diagram illustrating an upper receptacle of a quick-connecting receptacle for a liquid hydrogen LH2 storage tank according to an embodiment of the present disclosure; FIG. 3 is a diagram illustrating a lower receptacle of a quick-connecting receptacle for a liquid hydrogen LH2 storage tank according to an embodiment of the present disclosure; FIG. 4A is a diagram illustrating storage of liquid hydrogen LH2 using a quick-connecting receptacle for a liquid hydrogen LH2 storage tank according to an embodiment of the present disclosure; FIG. 4B is a diagram illustrating discharge of liquid hydrogen LH2 using a quick-connecting receptacle for a liquid hydrogen LH2 storage tank according to an embodiment of the present disclosure; FIG. 4C is a diagram illustrating an upper receptacle and a lower receptacle of a quick-connecting receptacle for a liquid hydrogen LH2 storage tank according to an embodiment of the present disclosure; FIG. 5 is a diagram illustrating discharge of gaseous hydrogen GH2 using a quick-connecting receptacle for a liquid hydrogen LH2 storage tank according to another embodiment of the present disclosure; and FIG. 6 is a diagram illustrating an example of using gaseous hydrogen GH2 discharged through a quick-connecting receptacle for a liquid hydrogen LH2 storage tank according to another embodiment of the present disclosure.

Referring to FIGS. 1 to 6, the quick-connecting receptacle 100 for a liquid hydrogen LH2 storage tank according to an embodiment of the present disclosure may include an upper receptacle 120 and a lower receptacle 130.

Referring to FIG. 1, a storage tank 110 stores liquid hydrogen LH2. The storage tank 110 according to an embodiment of the present disclosure may include a first transfer pipe 111, a second transfer pipe 112, a level sensor 113, a vacuum pump 114, and the like.

The storage tank 110 may include an outer tank 110a to which the receptacle 100 is coupled and an inner tank 110b to store liquid hydrogen LH2 and/or gaseous hydrogen GH2.

The outer tank 110a may guard the inner tank 110b by accommodating the inner tank 110b inside the outer tank 110a. The lower receptacle 130 is coupled to an upper portion of the outer tank 110a, and the outer tank 110a may be coupled to a vacuum pump 114. An inner tank 110b, the first transfer pipe 111, the second transfer pipe 112, etc. are located inside the outer tank 110a according to an embodiment of the present disclosure, so that the inner tank 110b, the first transfer pipe 111, the second transfer pipe 112, and the like can be protected from external impact, etc. In addition, since the space between the outer tank 110a and the inner tank 110b is maintained in a vacuum by the vacuum pump 114, insulation can be improved.

The inner tank 110b stores liquid hydrogen LH2 and/or gaseous hydrogen GH2. According to one embodiment of the present disclosure, the first transfer pipe 111 may be coupled to a lower portion of the inner tank 110b, and the second transfer pipe 112 may be coupled to an upper portion of the inner tank 110b. Liquid hydrogen LH2 introduced through the lower receptacle 130 and the first transfer pipe 111 is stored in the inner tank 110b; and vaporized gaseous hydrogen GH2 may be discharged to outside through the second transfer pipe 112 and the upper receptacle 120. In addition, it is also possible to discharge liquid hydrogen LH2 stored in the inner tank 110b through the first transfer pipe 111 and the receptacle 100.

According to an embodiment of the present disclosure, the inner tank 110b may include a level sensor 113. The level sensor 113 may detect a depth of liquid hydrogen LH2 stored in the inner tank 110b. The depth of liquid hydrogen LH2 in the inner tank 110b varies according to an amount of liquid hydrogen LH2 charged in the inner tank 110b. The level sensor 113 may detect the depth of liquid hydrogen LH2 by classifying it into levels such as low, medium, and high.

The first transfer pipe 111 may transfer liquid hydrogen LH2 between the storage tank 110 and the receptacle 100. The first transfer pipe 111 according to an embodiment of the present disclosure may be coupled to the lower portion of the inner tank 110b and connected to a first port 135 of the lower receptacle 130 (see FIG. 4A). Accordingly, liquid hydrogen LH2 introduced through the first port 135 may be stored in the inner tank 110b.

The second transfer pipe 112 may transfer gaseous hydrogen GH2 between the storage tank 110 and the receptacle 100. The second transfer pipe 112 according to an embodiment of the present disclosure may be coupled to the upper portion of the inner tank 110b and connected to a second port 136 of the lower receptacle 130 (see FIG. 4A). Accordingly, gaseous hydrogen GH2 vaporized in the inner tank 110b may be discharged to outside through the second port 136.

The receptacle 100 is a member connecting a transmission pipe 200 and the storage tank 110 so that liquid hydrogen LH2 introduced through the transmission pipe 200 is stored in the storage tank 110. An upper end portion of the receptacle 100 may be coupled to the transmission pipe 200 by welding or the like. Referring to FIGS. 4A to 4C, the receptacle 100 according to an embodiment of the present disclosure is formed by combining the upper receptacle 120 and the lower receptacle 130, and liquid hydrogen LH2 or the like may move through inside of the receptacle 100.

Referring to FIG. 2, the upper receptacle 120 is connected to a lower end portion of the transmission pipe 200, and may include an upper receptacle body 121, an upper connecting portion 122, a first flow path 123, and a second flow path 124, a third port 125, and the like. Referring to FIG. 2, the second flow path 124 may have the same pipe center as the first flow path 123.

The upper receptacle body 121 is a body of the upper receptacle 120 and may be formed in a cylindrical shape. The first flow path 123 is provided in a central portion of the upper receptacle body 121 according to an embodiment of the present disclosure; the second flow path 124 surrounding the first flow path 123 may be formed; and the upper connecting portion 122 may be provided on a side surface of the upper receptacle body 121. In addition, the third port 125 may be provided at a position spaced apart by a predetermined distance upward from the upper connecting portion 122.

The upper connecting portion 122 protrudes from the side of the upper receptacle body 121 and is coupled with a lower connecting portion 132 (see FIG. 3), thereby coupling the upper receptacle 120 and the lower receptacle 130.

According to an embodiment of the present disclosure, a fastening member 122a is provided in the upper connecting portion 122, and the fastening member 122a is inserted into a fastening groove 132a of the lower connecting portion 132 (see FIG. 3), so that the upper connecting portion 122 and the lower connecting portion 132 may be fastened.

According to an embodiment of the present disclosure, the fastening member 122a may be provided to correspond to a shape of the fastening groove 132a so as to be easily inserted into the fastening groove 132a. For example, the fastening member 122a may be provided with a ball or the like.

The first flow path 123 may be formed inside the upper receptacle body 121, and liquid hydrogen LH2 or gas hydrogen GH2 may flow through the first flow path 123. According to an embodiment of the present disclosure, liquid hydrogen LH2 or gaseous hydrogen GH2 passing through the first flow path 123 may flow into a cylinder member 133 through a first inlet/outlet 123a formed at the end of the first flow path 123 (see FIG. 4A).

According to an embodiment of the present disclosure, a distal end portion of the first flow path 123 may protrude a predetermined distance from the central portion of the upper receptacle body 121. The distal end portion of the first flow path 123 may have a step difference with an edge of a distal end of the upper receptacle body 121 (i.e., the distal end portion of the first flow path 123 is positioned lower than the distal end portion of the upper receptacle body 121). Accordingly, when the upper receptacle 120 moves downward, the first flow path 123 may pass through an open upper surface of the cylinder member 133 and be inserted into the cylinder member 133.

The first inlet/outlet 123*a* is formed at the distal end portion of the first flow path 123, and liquid hydrogen LH2 or gaseous hydrogen GH2 may enter/exit through the first inlet/outlet 123*a*. According to an embodiment of the present disclosure, when the upper receptacle 120 and the lower receptacle 130 are coupled, a horizontal position of the first inlet/outlet 123*a* may be positioned to be in line with a horizontal position of a cylinder hole 133*c* of the cylinder member 133. When the first inlet/outlet 123*a* is positioned to be in line with the cylinder hole 133*c* horizontally, liquid hydrogen LH2 or gaseous hydrogen GH2 introduced from the transmission pipe 200 through the receptacle 100 and the first inlet and outlet 123*a* may smoothly flow toward the first port 135 through the cylinder hole 133*c*.

The second flow path 124 is formed in a vertical direction along a circumference of the first flow path 123, and gaseous hydrogen GH2 may flow through the second flow path 124. Gaseous hydrogen GH2 vaporized in the inner tank 110*b* may flow to an upper portion of the second flow path 124 and be discharged to outside through the third port 125 formed on an upper portion of the second flow path 124 (see FIG. 2 and FIG. 4A). In addition, gaseous hydrogen GH2 introduced from the third port 125 may flow to the second port 136 through a second inlet/outlet 124*a* formed at a bottom of the second flow path 124 and is stored in the storage tank 110 (see FIG. 4B).

According to an embodiment of the present disclosure, a partition wall is formed between the second flow path 124 and the first flow path 123, so that gaseous hydrogen GH2 flowing through the second flow path 124 and liquid hydrogen LH2 flowing through the first flow path 123 may be blocked from each other.

According to an embodiment of the present disclosure, a distal end of the second flow path 124 may correspond to an edge of a distal end of the upper receptacle body 121. In addition, a distal end of the first flow path 123 may protrude a predetermined distance from a central portion of the upper receptacle body 121. Accordingly, a step may be formed between the distal end of the second flow path 124 and the distal end of the first flow path 123 (i.e., the distal end of the first flow path 123 is positioned lower than the distal end of the second flow path 124).

Referring to FIG. 4A, according to an embodiment of the present disclosure, when the upper receptacle 120 and the lower receptacle 130 are coupled, the distal end of the first flow path 123 may be inserted into the cylinder member 133 through a center of an upper end portion of the cylinder member 133. At this time, the distal end of the second flow path 124 pushes an upper edge of the cylinder member 133 downward. Accordingly, when the upper receptacle 120 and the lower receptacle 130 are coupled, the cylinder member 133 may move downward.

The second inlet/outlet 124*a* is formed below the second flow path 124, and gaseous hydrogen GH2 can enter/exit through the second inlet/outlet 124*a*. According to one embodiment of the present disclosure, when the upper receptacle 120 and the lower receptacle 130 are coupled, a horizontal position of the second inlet/outlet 124*a* may correspond to a horizontal position of the second port 136. When the second inlet/outlet 124*a* is positioned to be in line with the second port 136 horizontally, gaseous hydrogen GH2 may smoothly flow into the second flow path 124 through the second port 136, the second inlet/outlet 124*a*, etc.

The third port 125 is formed on the upper portion of the upper receptacle 120, and gaseous hydrogen GH2 may be discharged to outside or introduced from outside through the third port 125. According to an embodiment of the present disclosure, gaseous hydrogen GH2 vaporized in the storage tank 110 may be discharged to outside through the second transfer pipe 112, the second flow path 124, the third port 125, and the like.

Referring to FIG. 1 and FIG. 3, the lower receptacle 130 may be connected to the upper portion of the storage tank 110, and include a lower receptacle body 131, a lower connecting portion 132, a cylinder member 133, a cylinder spring 134, a first port 135, a second port 136, and the like.

According to an embodiment of the present disclosure, the lower receptacle body 131 is a body of the lower receptacle 130 and may be formed in a cylindrical shape. As a central portion of an upper surface of the lower receptacle body 131 is formed to be open, the upper receptacle body 121 may be inserted through the open upper surface of the lower receptacle body 131.

According to an embodiment of the present disclosure, the lower connecting portion 132 may protrude from an upper end portion of the lower receptacle body 131 and may be coupled to the upper connecting portion 122, so that the lower receptacle 130 and the upper receptacle 120 can be coupled.

When the upper receptacle 120 and the lower receptacle 130 are coupled, the lower connecting portion 132 may be inserted between the upper connecting portion 122 and the upper receptacle body 121. At this time, as the fastening member 122*a* of the upper connecting portion 122 is inserted into the fastening groove 132*a* of the lower connecting portion 132, the upper receptacle 120 and the lower receptacle 130 may be fastened in a fitting manner. According to an embodiment of the present disclosure, the fastening groove 132*a* may be provided to correspond to a shape of the fastening member 122*a* so that the fastening member 122*a* can be easily inserted.

The cylinder member 133 may be formed in a cylindrical shape and be accommodated inside the lower receptacle body 131. In addition, according to an embodiment of the present disclosure, since an upper surface of the cylinder member 133 is formed to be open, the distal end of the first flow path 123 may enter inside of the cylinder member 133.

Referring to FIGS. 2 and 4A, according to an embodiment of the present disclosure, a step is formed between the distal end portion of the first flow path 123 and the distal end portion of the second flow path 124 (i.e., the distal end portion of the first flow path 123 is located lower than the distal end portion of the second flow path 124). When the upper receptacle 120 moves in a direction of the lower receptacle 130, the distal end of the first flow path 123 is accommodated inside the cylinder member 133 and the distal end of the second flow path 124 may move while pushing the cylinder member 133 downward while contacting the upper edge of the cylinder member 133. Since the cylinder spring 134 is provided on a lower surface of the cylinder member 133 to support the cylinder member 133, movement of the cylinder member 133 can be limited.

Referring to FIG. 3, according to an embodiment of the present disclosure, an upper seal 133*a* may be provided on an upper side of the cylinder member 133, and a lower seal 133*b* may be provided on a lower side of the cylinder member 133. The upper seal 133*a* and the lower seal 133*b* may be positioned between the cylinder member 133 and the lower receptacle body 131, and the upper seal 133a and the lower seal 133b may come into close contact with the lower receptacle body 131. Accordingly, an upper portion and a lower portion of the upper seal 133a are blocked from each other by the upper seal 133a, and the upper and lower portions of the lower seal 133b are blocked from each other by the lower seal 133b, so that liquid hydrogen LH2 or gaseous hydrogen GH2 passing through the cylinder hole 133c can be prevented from flowing into the second port 136.

Referring to FIGS. 4A and 4B, according to one embodiment of the present disclosure, when the upper receptacle 120 and the lower receptacle 130 are coupled, as the cylinder member 133 also moves downward, a position of the cylinder hole 133c and a position of the first port 135 may correspond horizontally. In this case, the upper seal 133a may be located between the first port 135 and the second port 136, and the lower seal 133b may be located below the first port 135. In addition, the distal end of the second flow path 124 presses the upper surface of the cylinder member 133 downward, and the cylinder spring 134 supports the lower surface of the cylinder member 133. Accordingly, as the distal end of the second flow path 124 and the upper surface of the cylinder member 133 may come into close contact, loss of liquid hydrogen LH2 or gaseous hydrogen GH2 inside the cylinder member 133 to the second port 136 can be prevented.

Since liquefied hydrogen is produced at −253° C., if there is a change such as an increase in temperature, liquefied hydrogen can be vaporized again. Therefore, according to an embodiment of the present disclosure, the upper seal 133a and the lower seal 133b can be made of cryogenic sealing material so that the upper seal 133a and the lower seal 133b are not degenerated, damaged, or destroyed even in a cryogenic state.

According to one embodiment of the present disclosure, the cylinder spring 134 is provided on a bottom surface of the lower receptacle body 131 and may support the cylinder member 133. When the upper receptacle 120 and the lower receptacle 130 are coupled, the cylinder member 133 may be positioned to correspond to a horizontal position of the first port 135. At this time, the cylinder member 133 may be forced downward by the upper receptacle body 121 (or the distal end of the second flow path 124). The cylinder spring 134 is provided on the lower surface of the cylinder member 133, and by supporting the cylinder member 133 with an elastic force, a position of the cylinder member 133 can be fixed.

In addition, according to one embodiment of the present disclosure, the cylinder spring 134 applies force from bottom to top to bring the cylinder member 133 and the upper receptacle body 121 (or the distal end of the second flow path 124) into close contact, so that a shielding effect between the cylinder member 133 and the upper receptacle body 121 (or the distal end of the second flow path 124) can be improved.

The first port 135 may be formed in the lower portion of the lower receptacle body 131, and liquid hydrogen LH2 may enter/exit through the first port 135. According to one embodiment of the present disclosure, the first port 135 is connected to the first transfer pipe 111, and liquid hydrogen LH2 may flow between the storage tank 110 and the receptacle 100 through the first port 135.

The second port 136 is formed at a predetermined interval upward from the first port 135, and gaseous hydrogen GH2 may enter/exit through the second port 136. According to one embodiment of the present disclosure, the second port 136 may be connected to the second transfer pipe 112; and gaseous hydrogen GH2 may be discharged from the storage tank 110 through the second port 136 or gaseous hydrogen GH2 may flow into the storage tank 110.

As described above, the quick-connecting receptacle 100 for a liquid hydrogen LH2 storage tank may be used in a manner such as charging or discharging liquid hydrogen LH2 or discharging gaseous hydrogen GH2 to use as an energy source.

Referring to FIG. 4A, according to an embodiment of the present disclosure, the quick-connecting receptacle 100 for a liquid hydrogen LH2 storage tank may be used to charge liquid hydrogen LH2 into the storage tank 110. Liquid hydrogen LH2 introduced through the external transmission pipe 200 may pass through the first flow path 123 of the upper receptacle 120 and flow into the cylinder member 133 of the lower receptacle 130. Subsequently, liquid hydrogen LH2 may flow into the first port 135 through the cylinder hole 133c of the cylinder member 133. At this time, since the upper seal 133a of the cylinder member 133 is located in close contact with the lower receptacle body 131 on the upper portion of the first port 135, and the lower seal 133b is located under the first port 135 while closely adhering to the lower receptacle body 131, so that liquid hydrogen LH2 can flow only through the first port 135. As the first port 135 is connected to the first transfer pipe 111 and the first transfer pipe 111 is connected to the storage tank 110, liquid hydrogen LH2 may be charged into the storage tank 110 via the first transfer pipe 111.

FIGS. 1 and 4B, according to an embodiment of the present disclosure, the quick-connecting receptacle 100 for liquid hydrogen LH2 storage tank may be used to discharge liquid hydrogen LH2 charged in the storage tank 110. The process of discharging liquid hydrogen LH2 may be performed in a reverse process of the process of storing liquid hydrogen LH2 previously described. That is, liquid hydrogen LH2 charged in the storage tank 110 sequentially flows through the first transfer pipe 111, the first port 135, inside of the cylinder member 133, the first flow path 123, and the transmission pipe 200, and the like can be discharged to outside.

In addition, in this embodiment, by increasing pressure inside the storage tank 110, warm gaseous hydrogen GH2 may be injected into the storage tank 110 through the second flow path 124, so that liquid hydrogen LH2 inside the storage tank 110 can be easily discharged.

Referring to FIG. 5, the quick-connecting receptacle 100 for a liquid hydrogen LH2 storage tank according to another embodiment of the present disclosure may be used when discharging gaseous hydrogen GH2 charged in the storage tank 110 to outside to use gaseous hydrogen GH2 as an energy source. That is, gaseous hydrogen GH2 vaporized in the storage tank 110 may be discharged and used as an energy source.

In this embodiment, when the upper receptacle 120 and the lower receptacle 130 are coupled, the second port 136 may be located between the upper seal ring 133a and the lower seal 133b of the cylinder member 133. Accordingly, gaseous hydrogen GH2 introduced from the second port 136 is not lost to the lower side of the cylinder member 133 by the upper seal 133a and the lower seal 133b, and gaseous hydrogen GH2 may flow into the cylinder member 133 from the second port 136. Gaseous hydrogen GH2 introduced into the cylinder member 133 may flow to the transmission pipe 200 along the first flow path 123 and be discharged to outside. That is, gaseous hydrogen GH2 charged in the storage tank 110 is passed through the second transfer pipe 112, the second port 136, inside of the cylinder member 133, the first flow path 123, the transfer pipe 200, and the like (in this embodiment, the second flow path 124 may not be used).

In addition, referring to FIGS. 5 and 6, vaporized hydrogen gas GH2 discharged from the transmission pipe 200 may be used as a power source for personal mobility 147 and the like. According to one embodiment of the present disclosure, a heater 141 may be coupled to the inner tank 110b. When the heater 141 is operated, liquid hydrogen LH2 stored in the storage tank 110 may be vaporized into cold gaseous hydrogen GH2. Cold gaseous hydrogen GH2 may flow into the receptacle 100 through the second transfer pipe 112. The introduced cold gaseous hydrogen GH2 may pass through the first flow path 123 and be discharged to the transmission pipe 200. The pressure of the discharged cold gaseous hydrogen GH2 may be adjusted through a pressure gauge 142, a pressure relief valve 143, a pressure regulator 144, and the like. In addition, cold gaseous hydrogen GH2 can be temperature-controlled to room temperature while passing through a heat exchanger 145. Gaseous hydrogen GH2 at room temperature is supplied to a fuel cell 146 as fuel for the fuel cell 146, and electricity generated by the fuel cell 146 may be supplied to a personal mobility device 147 and the like and used as a power source for the personal mobility device 147.

Although the above has shown and described various embodiments of the present disclosure, the present disclosure is not limited to the specific embodiments described above. The above-described embodiments can be variously modified and implemented by those skilled in the art to which the present invention pertains without departing from the gist of the present disclosure claimed in the appended claims and these modified embodiments should not be understood separately from the technical spirit or scope of the present disclosure. Therefore, the technical scope of the present disclosure should be defined only by the appended claims.

In the embodiments disclosed herein, the arrangement of the illustrated components may vary depending on the environment or requirements in which the invention is implemented. For example, some components may be omitted or some components may be integrated and implemented as one.

What is claimed is:

1. A quick-connecting receptacle for a liquid hydrogen storage tank, comprising:
   a storage tank for storing liquid hydrogen; and
   a receptacle connecting an external transmission pipe and the storage tank so that liquid hydrogen introduced through the transmission pipe is stored in the storage tank,
   wherein the receptacle includes an upper receptacle connected to a lower end portion of the transmission pipe and a lower receptacle connected to an upper portion of the storage tank, wherein the upper receptacle comprises:
   an upper receptacle body;
   an upper connecting portion protruding from a side surface of the upper receptacle body so that the lower receptacle and the upper receptacle are coupled;
   a first flow path formed penetrating a central portion of the upper receptacle body and through which liquid hydrogen flows;
   a second flow path formed in a vertical direction along a circumference of the first flow path and through which gaseous hydrogen flows;
   a first inlet/outlet formed so that a lower end portion of the first flow path is open to allow liquid hydrogen to enter/exit;
   a second inlet/outlet formed in a lower portion of the second flow path through which gaseous hydrogen enters/exits; and
   a third port formed so that gaseous hydrogen is discharged to outside or introduced from outside; and
   the lower receptacle includes a cylinder accommodated therein, and as the cylinder moves up and down, liquid hydrogen or gaseous hydrogen is stored in the storage tank or liquid hydrogen or gaseous hydrogen is discharged from the storage tank to outside, wherein the lower receptacle comprises:
   a lower receptacle body formed in a cylindrical shape;
   a lower connecting portion protruding from an upper end of the lower receptacle body so that the upper receptacle and the lower receptacle are coupled;
   a cylinder spring provided on a bottom surface of the lower receptacle body to support the cylinder;
   a first port formed in the lower portion of the lower receptacle body and through which liquid hydrogen enters/exits; and
   a second port formed spaced apart from the first port by a predetermined distance upward and through which gaseous hydrogen enters/exits.

2. The quick-connecting receptacle according to claim 1, wherein an upper seal is provided on an upper side of the cylinder, so that upper and lower portions of the upper seal are blocked from each other by the upper seal, and wherein a lower seal is provided on a lower side of the cylinder, so that upper and lower portions of the lower seal are blocked from each other by the lower seal.

3. The quick-connecting receptacle according to claim 2, wherein the cylinder comprises:
   at least one cylinder hole provided between the upper seal and the lower seal to allow liquid hydrogen to enter/exit.

4. The quick-connecting receptacle according to claim 3, when the upper receptacle and the lower receptacle are coupled, the cylinder moves downwards by the first flow path, and the first port is located between the upper seal ring and the lower seal.

5. The quick-connecting receptacle according to claim 4, wherein liquid hydrogen introduced through the first flow path sequentially flows through the first inlet/outlet, inside of the cylinder, the cylinder hole, and the first port, and is stored in the storage tank.

6. The quick-connecting receptacle according to claim 5, wherein gaseous hydrogen stored in the storage tank is sequentially discharged to outside through the second port, the second inlet/outlet, the second flow path, and the third port.

7. The quick-connecting receptacle according to claim 4, wherein liquid hydrogen stored in the storage tank is sequentially discharged to outside through the first port, the cylinder hole, inside of the cylinder, the first inlet/outlet, and the first flow path.

8. The quick-connecting receptacle according to claim 7, wherein gaseous hydrogen introduced through the third port is sequentially stored in the storage tank through the second flow path, the second inlet/outlet, and the second port.

9. The quick-connecting receptacle according to claim 3, when the upper receptacle and the lower receptacle are coupled, the cylinder moves downward by the first flow path, and the second port is located between the upper seal ring and the lower seal.

10. The quick-connecting receptacle according to claim 9, wherein gaseous hydrogen stored in the storage tank is sequentially discharged to outside through the second port, the cylinder hole, inside of the cylinder, the first inlet/outlet, and the first flow path.

* * * * *